United States Patent
Hong

(10) Patent No.: US 12,531,441 B2
(45) Date of Patent: Jan. 20, 2026

(54) REQUEST TRANSMISSION METHOD AND APPARATUS, AND REQUEST RECEPTION METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/564,039

(22) PCT Filed: May 25, 2021

(86) PCT No.: PCT/CN2021/095869
§ 371 (c)(1),
(2) Date: Nov. 24, 2023

(87) PCT Pub. No.: WO2022/246661
PCT Pub. Date: Dec. 1, 2022

(65) Prior Publication Data
US 2024/0258842 A1 Aug. 1, 2024

(51) Int. Cl.
*H02J 50/80* (2016.01)
*H02J 50/20* (2016.01)

(52) U.S. Cl.
CPC ............. *H02J 50/80* (2016.02); *H02J 50/20* (2016.02)

(58) Field of Classification Search
None
See application file for complete search history.

(56) References Cited

U.S. PATENT DOCUMENTS

| | | | |
|---|---|---|---|
| 9,941,707 B1* | 4/2018 | Leabman | H02J 50/40 |
| 2012/0214536 A1 | 8/2012 | Kim et al. | |
| 2013/0279433 A1* | 10/2013 | Dinan | H04W 52/40 370/329 |
| 2015/0229133 A1* | 8/2015 | Reynolds | H02J 7/0048 307/24 |
| 2017/0324279 A1* | 11/2017 | Kang | H02J 50/80 |
| 2019/0131826 A1* | 5/2019 | Park | H02J 50/80 |
| 2019/0254013 A1* | 8/2019 | Chang | H04L 5/00 |
| 2019/0310388 A1* | 10/2019 | Park | G01N 27/20 |
| 2020/0127501 A1* | 4/2020 | Song | H02J 50/402 |
| 2021/0013750 A1 | 1/2021 | Kronander et al. | |

(Continued)

FOREIGN PATENT DOCUMENTS

| | | |
|---|---|---|
| CN | 103384952 A | 11/2013 |
| CN | 105493529 A | 4/2016 |

(Continued)

OTHER PUBLICATIONS

European Patent Office, Extended European Search Report Issued in Application No. 21942245.8, dated Feb. 23, 2024, Germany, 10 pages.

(Continued)

*Primary Examiner* — Adi Amrany
(74) *Attorney, Agent, or Firm* — Arch & Lake LLP; Hao Tan; Hao Li

(57) ABSTRACT

A request transmission method includes: transmitting a wireless charging request to a core network. The wireless charging request is used to request the core network to charge a terminal wirelessly.

19 Claims, 7 Drawing Sheets

Transmit a wireless charging request to a core network, where the wireless charging request is used to request the core network to select a target base station for charging the terminal wirelessly — S101

Receive response information corresponding to the wireless charging request from the core network — S201

Determine according to the response information whether the core network agrees on charging the terminal wirelessly, and/or that the core network performs a wireless charging configuration of charging the terminal wirelessly — S202

(56) References Cited

U.S. PATENT DOCUMENTS

| | | | | |
|---|---|---|---|---|
| 2022/0045554 A1* | 2/2022 | Leabman | ................ | H02J 50/40 |
| 2022/0217522 A1* | 7/2022 | Kim | ........................ | H04W 8/02 |
| 2023/0275686 A1* | 8/2023 | Shin | ..................... | H04L 1/0026 |
| | | | | 370/329 |
| 2023/0368584 A1* | 11/2023 | Jung | ..................... | G06N 20/00 |

FOREIGN PATENT DOCUMENTS

| | | | |
|---|---|---|---|
| CN | 110709881 | A | 1/2020 |
| CN | 111971873 | A | 11/2020 |
| EP | 3154153 | A1 | 4/2017 |
| WO | 2013086828 | A1 | 6/2013 |

OTHER PUBLICATIONS

ISA State Intellectual Property Office of the People's Republic of China, Written Opinion of the International Searching Authority Issued in Application No. PCT/CN2021/095869, dated Feb. 23, 2022, WIPO, 6 pages.

ISA State Intellectual Property Office of the People's Republic of China, International Search Report Issued in Application No. PCT/CN2021/095869, dated Feb. 23, 2022, with English translation,(4p).

* cited by examiner

Transmit a wireless charging request to a core network, where the wireless charging request is used to request the core network to select a target base station for charging the terminal wirelessly — S101

FIG. 1

Transmit a wireless charging request to a core network, where the wireless charging request is used to request the core network to select a target base station for charging the terminal wirelessly — S101

Receive response information corresponding to the wireless charging request from the core network — S201

Determine according to the response information whether the core network agrees on charging the terminal wirelessly, and/or that the core network performs a wireless charging configuration of charging the terminal wirelessly — S202

FIG. 2

Receive a wireless charging request transmitted by a terminal, where the wireless charging request is used to request the core network to select a target base station for charging the terminal wirelessly — S301

FIG. 3

Receive a wireless charging request transmitted by a terminal, where the wireless charging request is used to request the core network to select a target base station for charging the terminal wirelessly — S301

Determine a priority of charging the terminal wirelessly based on the type of the terminal — S401

Determine the wireless charging configuration of charging the terminal wirelessly based on the priority — S402

FIG. 4

REQUEST TRANSMISSION METHOD AND APPARATUS, AND REQUEST RECEPTION METHOD AND APPARATUS

CROSS-REFERENCE TO RELATED APPLICATION

This application is the U.S. national phase application of International Application No. PCT/CN2021/095869, filed on May 25, 2021, the disclosure of which is incorporated herein by reference in its entirety for all purposes.

TECHNICAL FIELD

The present disclosure relates to the technical field of communication, and in particular, to request transmission methods, request reception methods, request transmission apparatuses, request reception apparatuses, communication apparatuses, and non-transitory computer-readable storage media.

BACKGROUND

With the development of cellular mobile communication technologies and especially millimeter wave communication technologies, an increasing number of antennas may be configured in a base station. For example, the achievement of a massive multiple-input multiple-output (Massive MIMO) technology in 5G has to rely on a great number of antennas. Based on the great number of antennas, some base stations can also provide a wireless charging service for terminals.

SUMMARY

In view of this, examples of the present disclosure provide request transmission methods, request reception methods, request transmission apparatuses, request reception apparatuses, communication apparatuses and non-transitory computer-readable storage media to solve technical problems in the related technologies.

According to the first aspect of the present disclosure, a request transmission method is provided, which is applicable to a terminal. The method includes: transmitting a wireless charging request to a core network, wherein the wireless charging request is used to request the core network to charge the terminal wirelessly.

According to the second aspect of the present disclosure, a request reception method is provided, which is applicable to a core network. The method includes: receiving a wireless charging request transmitted by a terminal, wherein the wireless charging request is used to request the core network to charge the terminal wirelessly.

According to the third aspect of the present disclosure, a terminal is provided, including: one or more processors; one or more memories for storing instructions executable by the one or more processors. The computer program, when executed by the one or more processors, implements following act: transmitting a wireless charging request to a core network, wherein the wireless charging request is used to request the core network to charge the terminal wirelessly.

BRIEF DESCRIPTION OF THE DRAWINGS

The drawings related to the description of the examples will be briefly introduced to explain the technical solutions provided by examples of the present disclosure more clearly. The drawings in the following description illustrate some examples of the present disclosure, and based on these drawings, those of ordinary skill in the art may obtain other drawings without creative work.

FIG. 1 illustrates a schematic flowchart of a request transmission method according to an example of the present disclosure.

FIG. 2 illustrates a schematic flowchart of another request transmission method according to an example of the present disclosure.

FIG. 3 illustrates a schematic flowchart of a request reception method according to an example of the present disclosure.

FIG. 4 illustrates a schematic flowchart of another request reception method according to an example of the present disclosure.

DETAILED DESCRIPTION OF THE EMBODIMENTS

Figure 5:
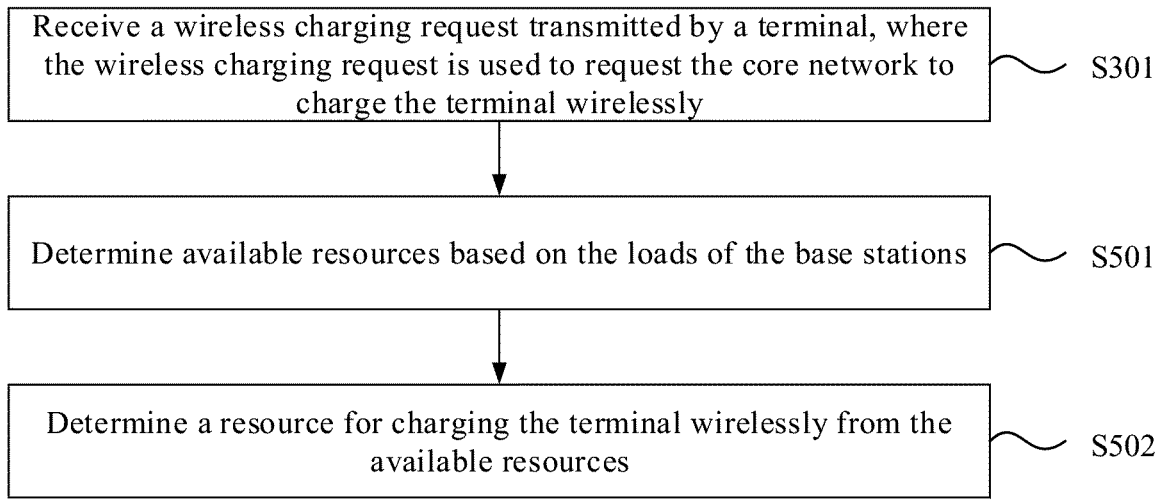
FIG. 5 illustrates a schematic flowchart of another request reception method according to an example of the present disclosure.

The following, in conjunction with the drawings of the examples of the present disclosure, will clearly and completely describe the technical solutions provided in the examples of the present disclosure. The described examples are a part, but not all, of the examples of the present disclosure. Based on the examples provided in the present disclosure, all of other examples, which can be obtained by those of ordinary skill in the art without creative work, shall fall within the protection scope of the present disclosure.

The terms used in the present disclosure are for the purpose of describing particular examples only, and are not intended to limit the present disclosure. Terms determined by "a" and "the" in their singular forms used in the examples of the present disclosure and the appended claims are also intended to include their plural forms, unless clearly indicated otherwise in the context. It is also to be understood that the term "and/or" as used herein is and includes any and all possible combinations of one or more of the associated listed items.

It is to be understood that, although terms "first," "second," "third," and the like may be adopted in the examples of the present disclosure to describe various information, such information should not be limited to these terms. These terms are only used to distinguish the information of the same type with each other. For example, without departing from the scope of the examples of the present disclosure, first information may be referred as second information; and similarly, second information may also be referred as first information. Depending on the context, the word "if" as used herein may be interpreted as "when," "upon," or "in response to determining."

For brevity and for convenience of understanding, the term "greater than" or "less than" and the term "higher than" or "lower than" are used herein when a size relationship is presented. However, those skilled in the art can understand that the term "greater than" also covers the meaning of "greater than or equal to," the term "less than" also covers the meaning of "less than or equal to," the term "higher than" covers the meaning of "higher than or equal to," and the term "lower than" also covers the meaning of "lower than or equal to."

FIG. 1 illustrates a schematic flowchart of a request transmission method according to an example of the present disclosure. The request transmission method illustrated in this example is applicable to a terminal. The terminal includes but not limited to a communication apparatus such as a mobile phone, a tablet computer, a wearable device, a sensor, and an Internet of Things (IoT) device. The terminal may act as user equipment to communicate with a device at a network side such as a base station or a core network. The base station includes but not limited to a base station in a communication system, such as a 4G base station, a 5G base station or a 6G base station.

As illustrated in FIG. 1, the request transmission method may include the following step.

At step S101, a wireless charging request is transmitted to a core network, where the wireless charging request is used to request the core network to charge the terminal wirelessly.

It is to be noted that, in the examples of the present disclosure, the core network does not directly charge the terminal wirelessly, but indicates a base station to charge the terminal wirelessly. The manner in which the base station charges the terminal wirelessly includes at least one of: an electromagnetic induction manner, an electromagnetic resonance manner, or a wireless radio frequency manner.

In an example, the base station charges the terminal in the wireless radio frequency manner, and specifically, it may be in over-the-air charging. In particular, the over-the-air charging means that the base station may transfer the energy to the terminal in a form of millimeter wave and narrow bandwidth through multiple antennas, and the terminal may receive the energy through a micro-beacon antenna and then convert it into electrical energy to realize the charging. The base station has the over-the-air charging capability, which may further mean that the base station is capable of determining the position of the terminal and then transfers the energy to the terminal at the position for charging.

In an example, the terminal may transmit the wireless charging request to the core network.

In particular, the transmitting the wireless charging request to the core network includes: transmitting the wireless charging request to the core network when the terminal meets a target condition.

That is, the terminal may transmit the wireless charging request to the core network only in the case that the target condition is met. The target condition may be determined in at least one way of: being indicated by the core network to the terminal, being determined independently by the terminal, or being negotiated between the terminal and the core network.

In an example, the target condition includes at least one of: the terminal being turned on; a power of the terminal being lower than a power threshold; the terminal requiring to transmit data of a target type; or the terminal being in a target area.

In an example that the target condition is determined independently by the terminal, the terminal may independently determine the power threshold, the target type, the target area, etc. In the example that the target condition is indicated by the core network, the core network may indicate the power threshold, the target type, the target area, etc.

For example, if the terminal being turned on is taken as the target condition, the terminal may transmit the wireless charging request to the core network once it is turned on.

For example, if the power of the terminal being lower than the power threshold (which may be a specific power value or a percentage of power) is taken as the target condition, the terminal may transmit the wireless charging request to the core network when its current remaining power is lower than the power threshold.

For example, if the terminal requiring to transmit data of the target type is taken as the target condition, the target type may be set as required. As an example, the target type may be at least one of video, voice, or text. As an example, the target type may be an enhanced mobile broadband (eMBB) service, an ultra reliable and low latency communication (URLLC) service, or a massive machine type communication (mMTC). When the target type is the video for example, the terminal may transmit the wireless charging request to the core network when it requires to transmit video data.

For example, if the terminal being in the target area (which may be a specific geographic fence or a cell) is taken as the target condition, the terminal may transmit the wireless charging request when it is located in the target area.

According to the examples of the present disclosure, the terminal can transmit the wireless charging request to the core network, so that the core network can determine that the terminal requires to be wirelessly charged based on the wireless charging request, and thereby select a base station to charge the terminal wirelessly in time.

In an example, the method further includes: transmitting a type of the terminal to the core network.

Terminals of different types may have different requirements for wireless charging. For example, a mobile terminal like a mobile phone generally requires a relatively large amount of wireless charging power, while a terminal such as a radio frequency identification (RFID) device and a sensor generally requires a relatively small amount of wireless charging power.

Therefore, the core network may determine a priority of charging the terminal wirelessly based on the type of the terminal, and determine a wireless charging configuration of charging the terminal wirelessly based on the priority. Specifically, the lower a battery capacity corresponding to the type of the terminal, the higher the priority of charging the terminal wirelessly, and the more timely a time domain resource in the wireless charging configuration is determined, for example, the closer to the current time. Accordingly, it can be ensured to complete charging the terminal requiring less power wirelessly as soon as possible, which reduces the number of terminals in a to-be-charged sequence, so as not to affect the communication processes of too many terminals.

In an example, transmitting the wireless charging request to the core network includes: transmitting the wireless charging request carried through one or more non-access stratum (NAS) signalings to the core network.

In an example, in the case that the terminal is idle, the one or more non-access stratum signalings include a first signaling in a registration management procedure.

In an example, the first signaling includes at least one of: an attach request signaling or a registration request signaling.

In particular, the terminal in the idle state may access the core network by transmitting the attach request signaling in a 4G network and by transmitting the registration request signaling in a 5G network.

In an example, in the case that the terminal is the non-idle state (e.g., an inactive state), the one or more NAS signalings include a second signaling in the registration management procedure, and/or a third signaling in a mobility management procedure, and/or a fourth signaling in a service request procedure.

In an example, the second signaling includes a mobility registration update signaling; and/or the third signaling includes a tracking area update signaling; and/or the fourth signaling includes a service request signaling.

When being non-idle, the terminal may transmit the second signaling carrying the wireless charging request to the core network during the registration management procedure, for example, the mobility registration update signaling carrying the wireless charging request. The terminal may transmit the third signaling carrying the wireless charging request to the core network during the mobility management procedure, for example, the tracking area update signaling carrying the wireless charging request. The terminal may transmit the fourth signaling carrying the wireless charging request to the core network during the service request procedure, for example, the service request signaling carrying the wireless charging request.

The terminal may select one of the above signalings to carry the wireless charging request, or may select a plurality of the above signalings to carry the wireless charging request, so as to ensure that the core network receives the wireless charging request successfully.

FIG. 2 illustrates a schematic flowchart of another request transmission method according to an example of the present disclosure. As illustrated in FIG. 2, the method further includes the following steps.

At step S201, response information corresponding to the wireless charging request is received from the core network.

At step S202, it is determined according to the response information whether the core network agrees on charging the terminal wirelessly, and/or that the core network performs a wireless charging configuration of charging the terminal wirelessly.

In an example, after receiving the wireless charging request transmitted by the terminal, the core network may determine whether to agree on charging the terminal wirelessly, and may generate the response information based on the result of the determination and transmit it to the terminal. The core network, when agrees on charging the terminal wirelessly, may further determine the wireless charging configuration of charging the terminal wirelessly and transmit to the terminal the wireless charging configuration that is also carried in the response information.

According to the response information, the terminal may determine whether the core network agrees on charging the terminal wirelessly, and may, when determining that the core network agrees on charging the terminal wirelessly, further determine the wireless charging configuration according to the response information, so that the terminal receives wireless charging signals based on the wireless charging configuration.

In an example, the wireless charging configuration includes at least one of:
a target base station, a wireless charging resource or a wireless charging power for charging the terminal wirelessly.

In an example, the terminal may determine whether its current position is located in a cell of the target base station, and may, when located in the cell of the target base station, receive the wireless charging signals transmitted by the target base station at the wireless charging resource (including a frequency domain resource and a time domain resource). It is not to receive the wireless charging signals at the wireless charging resource when its current position is not located in any cell of the target base station, so as to avoid wasting the wireless communication resources of the terminal.

It is to be noted that after determining the wireless charging configuration, the core network may also transmit the wireless charging configuration to the target base station, so that the target base station charges the terminal wirelessly based on the wireless charging configuration, for example, the target base station may transmit the wireless charging signals to the terminal at the wireless charging resource.

In an example, the wireless charging request carries wireless charging assistance information. The wireless charging assistance information is used to assist the core network in determining whether to agree on charging the terminal wirelessly, and/or assist the core network in determining to perform the wireless charging configuration of charging the terminal wirelessly.

By carrying the wireless charging assistance information in the wireless charging request, it can provide a reference for the core network, so that the core network determines whether to charge the terminal wirelessly, and determines to perform the wireless charging configuration of charging the terminal wirelessly. It is to be noted that the wireless charging assistance information is only used to assist the core network to charge the terminal wirelessly, rather than to indicate the core network to charge the terminal wirelessly. The core network may refer to the assistance information to determine how to charge the terminal wirelessly, or determine how to charge the terminal wirelessly without referring to the assistance information.

In an example, the wireless charging assistance information includes at least one of: charging direction information; charging antenna information; wireless charging capability; space status information; or wireless charging state.

In an example, the charging direction information is determined based on at least one of: a relative position of the terminal to the current access base station, an absolute position of the terminal to the current access base station, or a beam used in the communication between the terminal and the current access base station.

As an example, a relative direction may be determined as the charging direction based on the relative position of the terminal to the current access base station. As an example, an absolute direction may be determined as the charging direction based on the absolute position of the terminal to the current access base station. As an example, the direction of the beam used in the communication between the terminal and the current access base station (which may be a receiving beam of the terminal or a transmitting beam of the base station) may be used as the charging direction. After determining the charging direction, the core network may indicate the target base station to transmit the wireless charging signals along the charging direction, so as to charge the terminal wirelessly.

In an example, the wireless charging capability includes at least one of: a wireless charging power (the power supported by the terminal for receiving the wireless charging signals), a wireless charging frequency domain resource (the frequency band in which the terminal is capable of receiving the wireless charging signals), wireless charging time domain resources (the period during which the terminal is capable of receiving the wireless charging signals).

After receiving the wireless charging capability, the core network may indicate the target base station to charge the terminal in accordance with the wireless charging capability. As an example, the core network may indicate the target base station that the wireless charging power in the assistance information is taken as the power of charging the terminal wirelessly. As an example, the core network may indicate the target base station to transmit the wireless charging signals to the terminal at the wireless charging frequency domain resource. As an example, the core network may indicate the target base station to transmit the wireless charging signals to the terminal at the wireless charging time domain resource.

In an example, the space status information includes at least one of: a moving speed, a moving direction, or a position.

The terminal may detect its own space status information, for example, may detect its own moving speed, moving direction, and position (which may be a two-dimensional position on a plane or a three-dimensional position). The core network may determine whether to charge the terminal wirelessly and how to charge the terminal wirelessly based on the space status information.

For example, the space status information includes the position, and the core network may determine, based on the position of the terminal and the positions of the base stations with unlimited charging capability, the target base station whose efficiency of charging the terminal wirelessly is greater than an efficiency threshold from the base stations with unlimited charging capability. If the target base station can be determined, it is agreed to charge the terminal wirelessly, and otherwise, it is not agreed to charge the terminal wirelessly. As an example, it may determine distances between the base stations and the terminal based on the positions of the base stations and the position of the terminal, and then determine the efficiencies based on the distances. The greater the distance, the lower the efficiency.

In an example, the wireless charging state includes at least one of: a current remaining power, a required charging power, and a required charging time.

The core network may determine how to charge the terminal wirelessly based on the wireless charging state of the terminal. For example, if the wireless charging state includes the required charging time, the core network may indicate the target base station to keep charging the terminal wirelessly for the time.

FIG. 3 illustrates a schematic flowchart of a request reception method according to an example of the present disclosure. The request reception method illustrated in this example may be applicable to a core network. The core network may communicate with terminals and may also communicate with base stations. The base stations include but not limited to base stations in a communication system such as 4G base stations, 5G base stations, and 6G base stations. The terminals include but not limited to communication apparatuses such as mobile phones, tablet computers, wearable devices, sensors, and IoT devices.

As illustrated in FIG. 3, the request reception method may include the following step.

At step S301, a wireless charging request transmitted by a terminal is received, where the wireless charging request is used to request the core network to charge the terminal wirelessly.

According to the example of the present disclosure, the terminal can transmit the wireless charging request to the core network, so that the core network can determine that the terminal requires to be wirelessly charged based on the wireless charging request, and thereby select a base station to charge the terminal wirelessly in time.

In an example, the method further includes: determining whether to agree on charging the terminal wirelessly and/or determining to perform a wireless charging configuration of charging the terminal wirelessly based on at least one of: a type of the terminal, wireless charging assistance information of the terminal, or states of base stations with wireless charging capability.

The terminal may transmit its own type, the wireless charging assistance information, etc. to the core network, and the base stations with wireless charging capability may also transmit their real-time states to the core network. Therefore, the core network may comprehensively consider the type of the terminal, the wireless charging assistance information and the states of the base stations, so as to fully and accurately determine whether to agree on charging the terminal wirelessly, and determine the wireless charging configuration in the case of agreeing on charging the terminal wirelessly.

FIG. 4 illustrates a schematic flowchart of another request reception method according to an example of the present disclosure. As illustrated in FIG. 4, determining the wireless charging configuration of charging the terminal wirelessly based on the type of the terminal includes the following steps.

At step S401, a priority of charging the terminal wirelessly is determined based on the type of the terminal.

At step S402, the wireless charging configuration of charging the terminal wirelessly is determined based on the priority.

In an example, the lower a battery capacity corresponding to the type of the terminal, the higher the priority of charging the terminal wirelessly.

Terminals of different types may have different requirements for wireless charging. For example, a mobile terminal like a mobile phone generally requires a relatively large amount of wireless charging power, while a terminal such as a RFID device and a sensor generally requires a relatively small amount of wireless charging power.

Therefore, the core network may determine the priority of charging the terminal wirelessly based on the type of the terminal, and determine the wireless charging configuration of charging the terminal wirelessly based on the priority. Specifically, the lower a battery capacity corresponding to the type of the terminal, the higher the priority of charging the terminal wirelessly, and the more timely a time domain resource in the wireless charging configuration is determined, for example, the closer to the current time. Accordingly, it can be ensured to complete charging the terminal requiring less power wirelessly as soon as possible, which reduces the number of terminals in a to-be-charged sequence, so as not to affect the communication processes of too many terminals.

In an example, the states of the base stations include at least one of: loads of the base stations, or antenna usages of the base stations.

FIG. 5 illustrates a schematic flowchart of another request reception method according to an example of the present disclosure. As illustrated in FIG. 5, the states of the base stations include the loads of the base stations, and determining the wireless charging configuration of charging the terminal wirelessly based on the states of the base stations includes the following steps.

At step S501, available resources are determined based on the loads of the base stations.

At step S502, a resource for charging the terminal wirelessly is determined from the available resources.

In an example, the core network may determine the wireless charging configuration of charging the terminal wirelessly based on the loads of the base stations, for example, may determine the available resources based on the loads of the base stations and determine the resource for charging the terminal wirelessly form the available resources.

The core network may also determine whether to agree on charging the terminal wirelessly based on the loads of the base stations. For example, it agrees on charging the terminal wirelessly when the load of at least one base station is lower than a load threshold and does not agree on charging the terminal wirelessly when the load of any base station is not lower than the load threshold.

Figure 6:
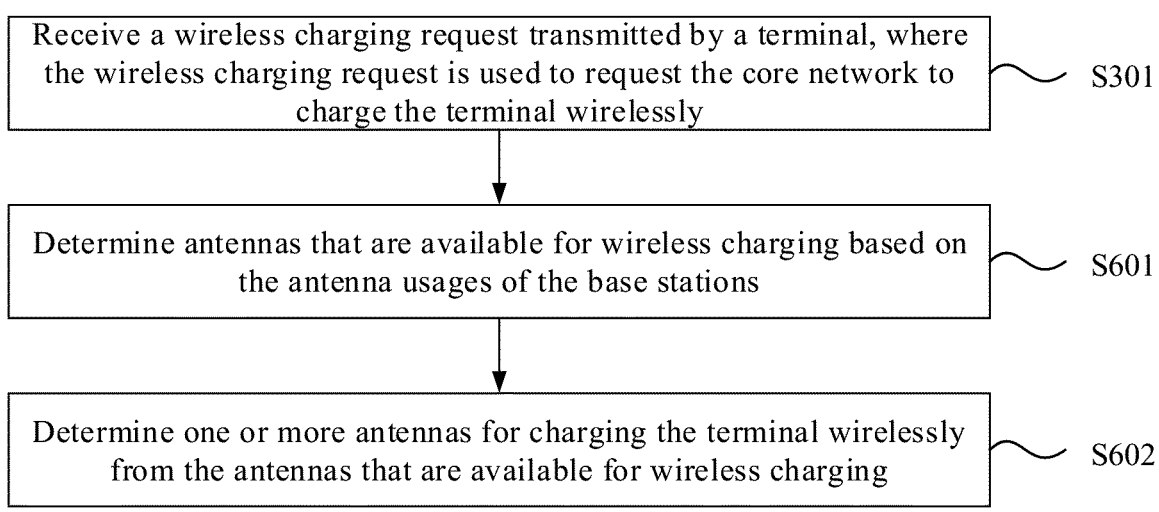
FIG. 6 illustrates a schematic flowchart of another request reception method according to an example of the present disclosure.

FIG. 6 illustrates a schematic flowchart of another request reception method according to an example of the present disclosure. As illustrated in FIG. 6, the states of the base stations include the antenna usages of the base stations, and determining the wireless charging configuration of charging the terminal wirelessly based on the states of the base stations includes the following steps.

At step S601, antennas that are available for wireless charging are determined based on the antenna usages of the base stations.

At step S602, one or more antennas for charging the terminal wirelessly are determined from the antennas that are available for wireless charging.

In an example, the core network may determine the wireless charging configuration of charging the terminal wirelessly based on the antenna usages of the base stations, for example, determine the antennas that are available for wireless charging based on the antenna usages of the base stations, and determine the one or more antennas for charging the terminal wirelessly from the antennas that are available for wireless charging.

In particular, a condition of determining an antenna that is available for wireless charging includes but not limited to whether the antenna is currently occupied (it may be used for wireless charging if not occupied) and a usage frequency of the antenna (it may be used for wireless charging if its usage frequency is lower than a frequency threshold).

Figure 7:
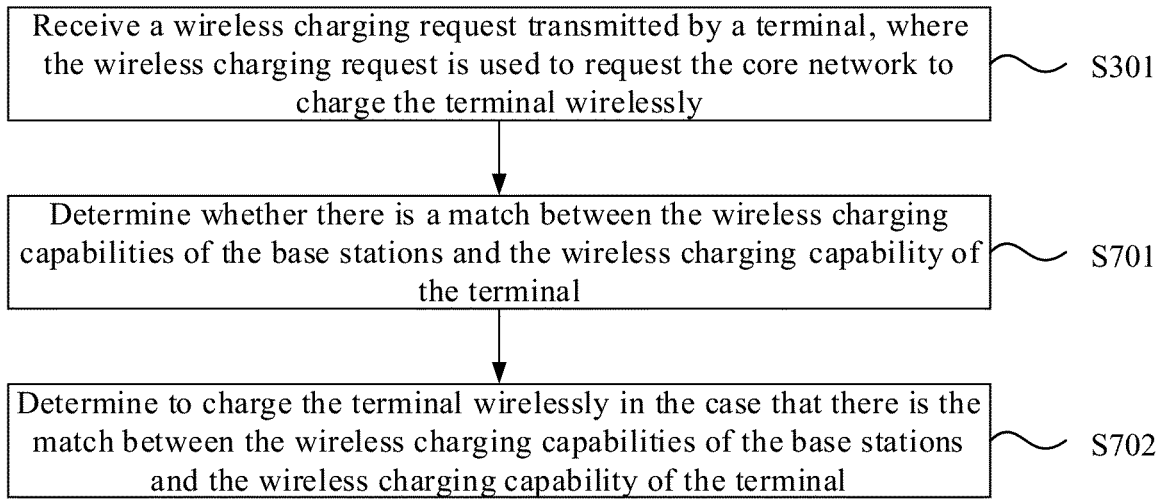
FIG. 7 illustrates a schematic flowchart of another request reception method according to an example of the present disclosure.

FIG. 7 illustrates a schematic flowchart of another request reception method according to an example of the present disclosure. As illustrated in FIG. 7, the wireless charging assistance information includes the wireless charging capability of the terminal, and determining whether to charge the terminal wirelessly based on the wireless charging assistance information includes the following steps.

At step S701, it is determined whether there is a match between the wireless charging capabilities of the base stations and the wireless charging capability of the terminal.

At step S702, it is determined to charge the terminal wirelessly in the case that there is the match between the wireless charging capabilities of the base stations and the wireless charging capability of the terminal.

In an example, the core network may also determine the wireless charging capabilities of the base stations, and then determine whether there is the match between the wireless charging capabilities of the base stations and the wireless charging capability of the terminal. For example, the wireless charging capability of the terminal includes wireless charging power P1 and wireless charging frequency f1. A base station may determine whether it is capable of charging the terminal wirelessly with power P1 and whether it is capable of transmitting wireless charging signals to the terminal at frequency f1. It is determined that the own wireless charging capability of the base station cannot match with the wireless charging capability of the terminal if the base station is not capable of charging the terminal with power P1 and/or is not capable of transmitting the wireless charging signals to the terminal at frequency f1, and otherwise, it is determined to be matched. It agrees on charging the terminal wirelessly only in the case that there is the match between the wireless charging capabilities of the base stations and the wireless charging capability of the terminal.

In the case of agreeing on charging the terminal wirelessly, the wireless charging configuration may be further determined based on the wireless charging capability of the terminal. As an example, the power of the wireless charging signals may be set as the wireless charging power. As an example, it may indicate a base station to transmit the wireless charging signals to the terminal at the wireless charging frequency in the assistance information.

In an example, the wireless charging assistance information of the terminal includes at least one of:

charging direction information; charging antenna information; wireless charging capability; space status information; or wireless charging state.

Figure 8:
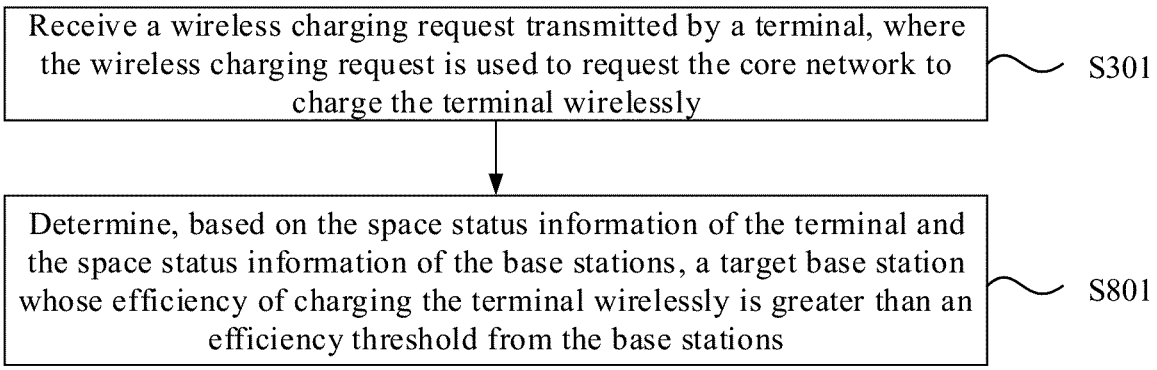
FIG. 8 illustrates a schematic flowchart of another request reception method according to an example of the present disclosure.

FIG. 8 illustrates a schematic flowchart of another request reception method according to an example of the present disclosure. As illustrated in FIG. 8, the wireless charging assistance information includes the space status information of the terminal, the states of the base stations include space status information of the base stations, and determining the wireless charging configuration of charging the terminal wirelessly based on the wireless charging assistance information of the terminal and the states of the base stations includes the following step.

At step S801, it is determined, based on the space status information of the terminal and the space status information of the base stations, a target base station whose efficiency of charging the terminal wirelessly is greater than an efficiency threshold from the base stations.

In an example, the base station may determine, from the base stations with wireless charging capability, the target base station whose efficiency of charging the terminal wirelessly is greater than the efficiency threshold based on the space status information of the terminal and the space state information of the base stations with wireless charging capability.

For example, the space status information includes the positions, and the core network may determine, based on the position of the terminal and the positions of the base stations with unlimited charging capability, the target base station whose efficiency of charging the terminal wirelessly is greater than the efficiency threshold from the base stations with unlimited charging capability. If the target base station can be determined, it is agreed to charge the terminal wirelessly, and otherwise, it is not agreed to charge the terminal wirelessly.

As an example, it may determine a distance between a base station and the terminal based on the position of the base station and the position of the terminal, and then determine the efficiency based on the distance. The greater the distance, the lower the efficiency. The obstacles between the two may also be determined based on the positions of the two, and the efficiency of wireless charging may be determined based on the states (density, height, etc.) of the obstacles. For example, the more the obstacles, the lower the charging efficiency.

In an example, the method further includes:
transmitting the wireless charging configuration of charging the terminal wirelessly to the terminal in the case that the wireless charging configuration is determined. The core network may also transmit the wireless charging configuration to the target base station. Therefore, the target base station can transmit the wireless charging signals to the terminal according to the wireless charging configuration, and enable the terminal to receive the wireless charging signals according to the wireless charging configuration.

Corresponding to the foregoing examples of the request transmission methods and the request reception methods, the present disclosure also provides examples of request transmission apparatuses and request reception apparatuses.

Figure 9:
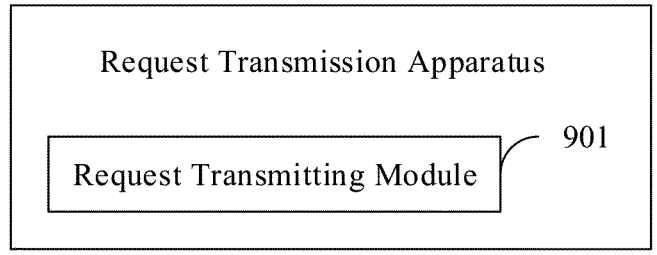
FIG. 9 illustrates a schematic block diagram of a request transmission apparatus according to an example of the present disclosure.

FIG. 9 illustrates a schematic block diagram of a request transmission apparatus according to an example of the present disclosure. The request transmission apparatus illustrated in this example may be applicable to a terminal. The terminal includes but not limited to a communication apparatus such as a mobile phone, a tablet computer, a wearable device, a sensor, and an IoT device. The terminal may act as user equipment to communicate with a device at a network side such as a base station or a core network. The base station includes but not limited to a base station in a communication system, such as a 4G base station, a 5G base station or a 6G base station.

As illustrated in FIG. 9, the request transmission apparatus may include:
a request transmitting module 901 that is configured to transmit a wireless charging request to a core network. The wireless charging request is used to request the core network to charge the terminal wirelessly.

In an example, the request transmitting module is configured to transmit the wireless charging request to the core network when the terminal meets a target condition.

In an example, the target condition includes at least one of: the terminal being turned on; a power of the terminal being lower than a power threshold; the terminal requiring to transmit data of a target type; or the terminal being in a target area.

Figure 10:
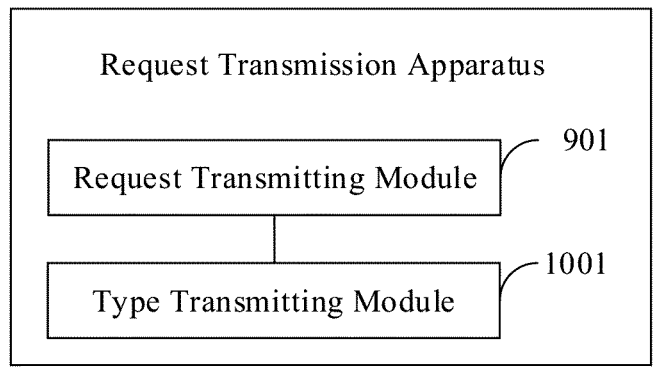
FIG. 10 illustrates a schematic block diagram of another request transmission apparatus according to an example of the present disclosure.

FIG. 10 illustrates a schematic block diagram of another request transmission apparatus according to an example of the present disclosure. As illustrated in FIG. 10, the apparatus further includes:
a type transmitting module 1001 that is configured to transmit a type of the terminal to the core network.

In one example, the request transmitting module is configured to transmit the wireless charging request carried through one or more non-access stratum signalings to the core network.

In an example, in the case that the terminal is idle, the one or more non-access stratum signalings include a first signaling in a registration management procedure.

In an example, the first signaling includes at least one of: an attach request signaling or a registration request signaling.

In an example, in a case that the terminal is non-idle, the one or more non-access stratum signalings include a second signaling in the registration management procedure, and/or a third signaling in a mobility management procedure, and/or a fourth signaling in a service request procedure.

In an example, the second signaling includes a mobility registration update signaling, and/or the third signaling includes a tracking area update signaling, and/or the fourth signaling includes a service request signaling.

Figure 11:
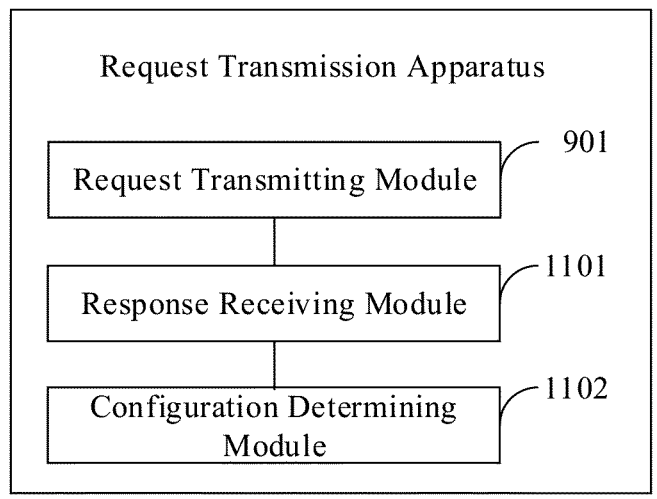
FIG. 11 illustrates a schematic block diagram of another request transmission apparatus according to an example of the present disclosure.

FIG. 11 illustrates a schematic block diagram of another request transmission apparatus according to an example of the present disclosure. As illustrated in FIG. 11, the apparatus further includes:
a response receiving module 1101 that is configured to receive response information corresponding to the wireless charging request from the core network; and
a configuration determining module 1102, configured to determine, according to the response information, whether the core network agrees on charging the terminal wirelessly, and/or that the core network performs a wireless charging configuration of charging the terminal wirelessly.

In an example, the wireless charging configuration includes at least one of: a target base station, a wireless charging resource or a wireless charging power for charging the terminal wirelessly.

In an example, the wireless charging request carries wireless charging assistance information. The wireless charging assistance information is used to assist the core network in determining whether to agree on charging the terminal wirelessly, and/or assist the core network in determining to perform the wireless charging configuration of charging the terminal wirelessly.

Figure 12:
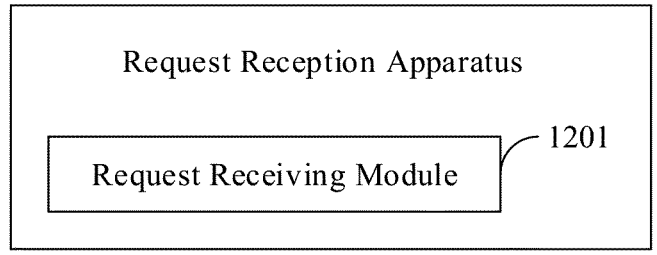
FIG. 12 illustrates a schematic block diagram of a request reception apparatus according to an example of the present disclosure.

FIG. 12 illustrates a schematic block diagram of a request reception apparatus according to an example of the present disclosure. The request reception apparatus illustrated in this example may be applicable to a core network. The core network may communicate with terminals and may also communicate with base stations. The base stations include but not limited to base stations in a communication system such as 4G base stations, 5G base stations, and 6G base stations. The terminals include but not limited to communication apparatuses such as mobile phones, tablet computers, wearable devices, sensors, and IoT devices.

As illustrated in FIG. 12, the request reception apparatus may include:
a request receiving module 1201 that is configured to receive a wireless charging request transmitted by a terminal. The wireless charging request is used to request the core network to charge the terminal wirelessly.

Figure 13:
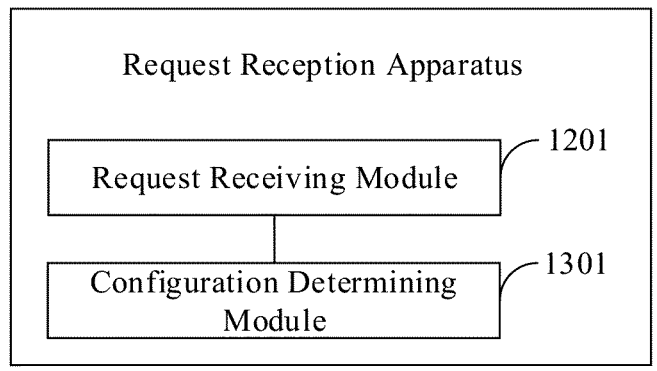
FIG. 13 illustrates a schematic block diagram of another request reception apparatus according to an example of the present disclosure.

FIG. 13 illustrates a schematic block diagram of another request reception apparatus according to an example of the present disclosure. As illustrated in FIG. 13, the apparatus further includes:
a configuration determining module 1301 that is configured to determine whether to agree on charging the terminal wirelessly and/or determine to perform a wireless charging configuration of charging the terminal wirelessly based on at least one of: a type of the terminal, wireless charging assistance information of the terminal, or states of base stations with wireless charging capability.

In an example, the configuration determining module is configured to determine a priority of charging the terminal wirelessly based on the type of the terminal, and determine the wireless charging configuration of charging the terminal wirelessly based on the priority.

In an example, the lower a battery capacity corresponding to the type of the terminal, the higher the priority of charging the terminal wirelessly.

In an example, the states of the base stations include at least one of: loads of the base stations, or antenna usages of the base stations.

In an example, the states of the base stations include the loads of the base stations, and the configuration determining module is configured to determine available resources based on the loads of the base stations and determine a resource for charging the terminal wirelessly from the available resources.

In an example, the states of the base stations include the antenna usages of the base stations, and the configuration determining module is configured to determine antennas that are available for wireless charging based on the antenna usages of the base stations and determine one or more antennas for charging the terminal wirelessly from the antennas that are available for wireless charging.

In an example, the wireless charging assistance information includes wireless charging capability of the terminal, and the configuration determining module is configured to determine whether there is a match between wireless charging capabilities of the base stations and the wireless charging capability of the terminal, and determine to charge the terminal wirelessly in the case that there is the match between the wireless charging capabilities of the base stations and the wireless charging capability of the terminal.

In an example, the wireless charging assistance information of the terminal includes at least one of: charging direction information; charging antenna information; wireless charging capability; space status information; or wireless charging state.

In an example, the wireless charging assistance information includes the space status information of the terminal, the states of the base stations include space status information of the base stations, and the configuration determining module is configured to determine, based on the space status information of the terminal and the space status information of the base stations, a target base station whose efficiency of charging the terminal wirelessly is greater than an efficiency threshold from the base stations.

Figure 14:
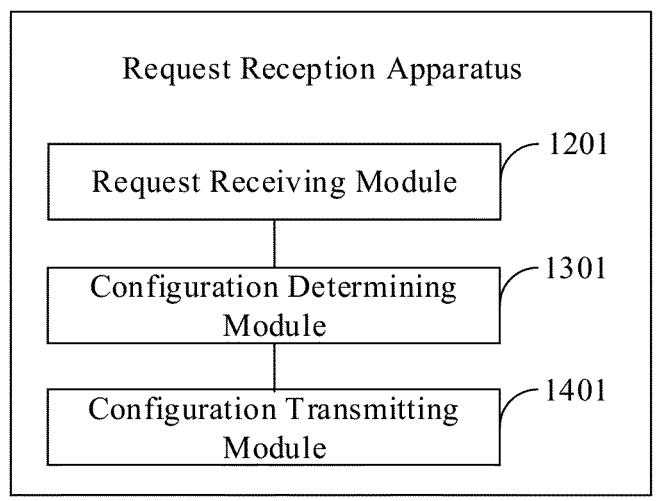
FIG. 14 illustrates a schematic block diagram of another request reception apparatus according to an example of the present disclosure.

FIG. 14 illustrates a schematic block diagram of another request reception apparatus according to an example of the present disclosure. As illustrated in FIG. 14, the apparatus further includes:

a configuration transmitting module 1401 that is configured to transmit the wireless charging configuration of charging the terminal wirelessly to the terminal in the case that the wireless charging configuration is determined.

Regarding the apparatus in the foregoing examples, the specific manner in which each module performs its operation has been described in detail in the examples of the related methods, and will not be repeated here.

Since the apparatus examples essentially correspond to the method examples, reference may be made to the description of related parts of the method examples. The apparatus examples described above are illustrative, in which the modules described as separate components may or may not be physically separated, and the components displayed as modules may or may not be physical modules, that is, may be located in one place or distributed to multiple modules in a network. Some or all of the modules may be selected according to actual needs to achieve the objectives of the solutions of the examples. It can be understood and implemented by those of ordinary skill in the art without any creative effort.

Examples of the present disclosure also provide a communication apparatus, which includes: one or more processors; and one or more memories for storing a computer program. The computer program, when executed by the one or more processors, implements the request transmission method described in any one of the above examples.

Examples of the present disclosure also provide a communication apparatus, which includes: one or more processors; and one or more memories for storing a computer program. The computer program, when executed by the one or more processors, implements the request reception method described in any one of the above examples.

Examples of the present disclosure also provide a non-transitory computer-readable storage medium for storing a computer program. The computer program, when executed by one or more processors, implements the step(s) of the request transmission method described in any one of the above examples.

Examples of the present disclosure also provide a non-transitory computer-readable storage medium for storing a computer program. The computer program, when executed by one or more processors, implements the step(s) of the request reception method described in any one of the above examples.

Figure 15:
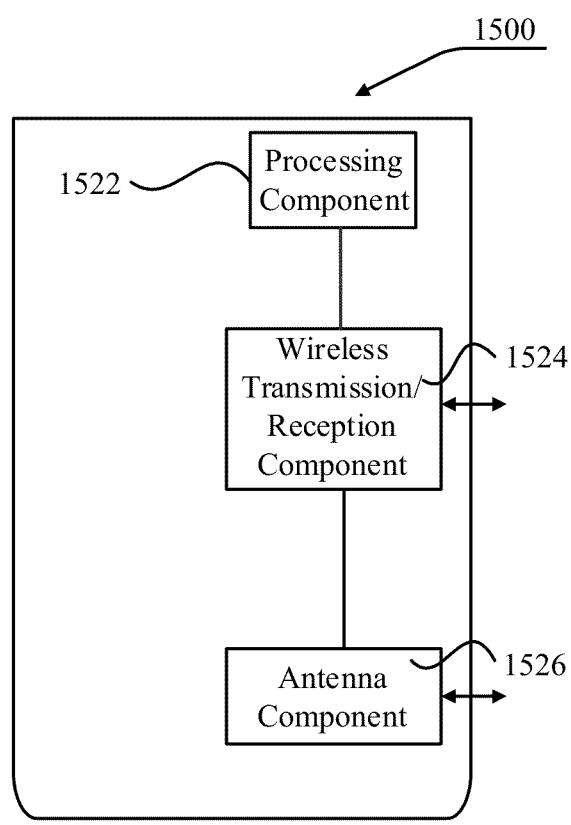
FIG. 15 is a schematic block diagram of a base station according to an example of the present disclosure.

As illustrated in FIG. 15, FIG. 15 illustrates a schematic block diagram of a base station 1500 according to an example of the present disclosure. The base station 1500 may be provided as a base station. In referring to FIG. 15, the base station 1500 includes a processing component 1522, a wireless transmission/reception component 1524, an antenna component 1526, and a signal processing part peculiar to a wireless interface. The processing component 1522 may further include one or more processors. One of the processors in the processing component 1522 may be configured to implement the step(s) of interacting between the base station and the core network and/or the terminal in any one of the above examples.

Figure 16:
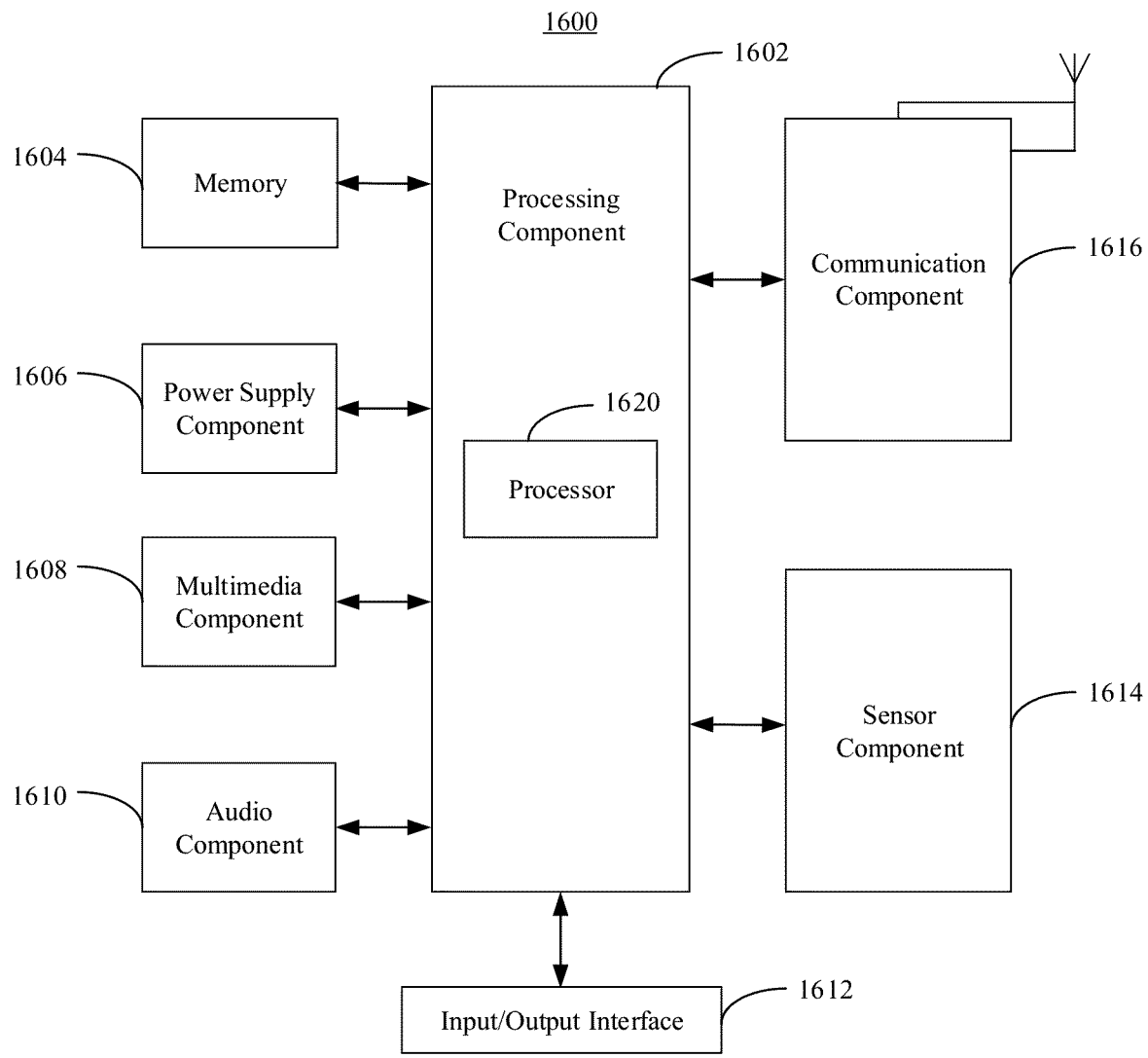
FIG. 16 illustrates a schematic block diagram of an apparatus for transmitting a request according to an example of the present disclosure.

FIG. 16 illustrates a schematic block diagram of an apparatus 1600 for transmitting a request according to an example of the present disclosure. For example, the apparatus 1600 may be a mobile phone, a computer, a digital broadcasting user device, a messaging device, a game console, a tablet device, a medical device, a fitness device, a personal digital assistant, and the like.

In referring to FIG. 16, the apparatus 1600 may include one or more of the following components: a processing component 1602, a memory 1604, a power supply component 1606, a multimedia component 1608, an audio component 1610, an input/output (I/O) interface 1612, a sensor component 1614, and a communication component 1616.

The processing component 1602 generally controls the overall operations of the apparatus 1600, such as operations associated with display, phone calls, data communications, camera operations, and recording operations. The processing component 1602 may include one or more processors 1620 to execute instructions to complete all or a part of the step(s) of the above request transmission methods. In addition, the processing component 1602 may include one or more modules which facilitate the interaction between the processing component 1602 and other components. For example, the processing component 1602 may include a multimedia module to facilitate the interaction between the multimedia component 1608 and the processing component 1602.

The memory 1604 is configured to store various types of data to support the operations of the apparatus 1600. Examples of such data include instructions for any application or method operated on the apparatus 1600, contact data, phonebook data, messages, pictures, videos, and the like. The memory 1604 may be implemented by any type of volatile or non-volatile storage device or a combination thereof, such as a static random access memory (SRAM), an electrically erasable programmable read-only memory (EE-PROM), an erasable and programmable read-only memory (EPROM), a programmable read-only memory (PROM), a read-only memory (ROM), a magnetic memory, a flash memory, a magnetic disk or an optical disk.

The power supply component 1606 provides power for various components of the apparatus 1600. The power supply component 1606 may include a power management system, one or more power supplies, and other components associated with generating, managing, and distributing power for the apparatus 1600.

The multimedia component 1608 includes a screen providing an output interface between the apparatus 1600 and a user. In some examples, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 1608 includes a front camera and/or a rear camera. The front camera and/or rear camera may receive external multimedia data when the apparatus 1600 is in an operating mode, such as a photographing mode or a video mode. Each front camera and rear camera may be a fixed optical lens system or have focal length and optical zooming capability.

The audio component 1610 is configured to output and/or input audio signals. For example, the audio component 1610 includes a microphone (MIC) that is configured to receive an external audio signal when the apparatus 1600 is in an operating mode, such as a call mode, a recording mode, and a voice recognition mode. The received audio signal may be further stored in memory 1604 or transmitted via communication component 1616. In some examples, the audio component 1610 also includes a speaker for outputting audio signals.

The I/O interface 1612 provides an interface between the processing component 1602 and a peripheral interface module. The above peripheral interface module may be a keyboard, a click wheel, buttons, or the like. These buttons may include but not limited to a home button, a volume button, a start button and a lock button.

The sensor component 1614 includes one or more sensors to provide the apparatus 1600 with status assessments in various aspects. For example, the sensor component 1614 may detect an open/closed state of the apparatus 1600 and a relative positioning of components such as the display and keypad of the apparatus 1600, and the sensor component 1614 can also detect a change in position of the apparatus 1600 or a component of the apparatus 1600, the presence or absence of user contact with the apparatus 1600, orientation or acceleration/deceleration of the apparatus 1600, and temperature change of the apparatus 1600. The sensor component 1614 may include a proximity sensor configured to detect the presence of a nearby object without any physical contact. The sensor component 1614 may further include an optical sensor, such as a complementary metal-oxide-semiconductor (CMOS) or charged coupled device (CCD) image sensor which is used in imaging applications. In some examples, the sensor component 1614 may also include an acceleration sensor, a gyro sensor, a magnetic sensor, a pressure sensor, or a temperature sensor.

The communication component 1616 is configured to facilitate wired or wireless communication between the apparatus 1600 and other devices. The apparatus 1600 may access a wireless network based on a communication standard, such as WiFi, 2G or 3G, 4G LTE, 5G NR, or a combination thereof. In an example, the communication component 1616 receives broadcast signals or broadcast related information from an external broadcast management system via a broadcast channel. In an example, the communication component 1616 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In one or more examples, the apparatus 1600 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the foregoing request transmission methods.

In one or more examples, there is also provided a non-transitory computer-readable storage medium including instructions, such as the memory 1604 including instructions. These instructions may be executed by the one or more processors 1620 of the apparatus 1600 to complete the foregoing request transmission methods. For example, the non-transitory computer-readable storage medium may be a read-only memory (ROM), a random access memory (RAM), a CD-ROM, a magnetic tape, a floppy disk, an optical data storage device, and the like.

According to the examples of the present disclosure, the terminal can transmit a wireless charging request to the core network, so that the core network can determine based on the wireless charging request that the terminal requires to be wirelessly charged, and thereby select a base station to charge the terminal wirelessly in time.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are to be indicated by appended claims.

It is to be understood that the present disclosure is not limited to the above-described accurate structures illustrated in the drawings, and various modifications and changes can be made to the present disclosure without departing from the scope thereof. The scope of the present disclosure is to be limited only by the appended claims.

It is to be noted that the relational terms such as "first" and "second" used here are intended to distinguish one entity or operation from another entity or operation rather than to require or imply any such actual relationship or order existing between these entities or operations. Also, the term "including," "containing," or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in a process, method, article or device including the element.

The methods and apparatuses provided by the examples of the present disclosure are described in detail above. Specific examples are used in this disclosure to illustrate the principle and the implementations of the present disclosure. The description of the above examples is only used to help understand the methods and its core idea of the present disclosure. Moreover, those skilled in the art can change both the specific implementations and the application scope according to the idea of the present disclosure. In summary, the content of this specification should not be construed as a limitation to the present disclosure.

The invention claimed is:

1. A request transmission method, comprising:
transmitting, by a terminal, a wireless charging request to a core network through one or more non-access stratum signalings in a non-access stratum when the terminal meets a target condition, wherein the target condition comprises at least the terminal being required to transmit data of a target type, wherein in a case that the terminal is idle, the one or more non-access stratum signalings comprise a first signaling in a registration management procedure, and wherein the first signaling comprises at least one of the following signalings: an attach request signaling, or a registration request signaling;
receiving, by the core network, the wireless charging request from the terminal;
selecting, by the core network, a target base station from a plurality of base stations for charging the terminal wirelessly based on the wireless charging request;
determining, by the core network, to perform a wireless charging configuration of charging the terminal wirelessly at least based on a priority of charging the terminal wirelessly, wherein the wireless charging configuration indicates at least the target base station;
transmitting, by the core network, response information to the terminal, wherein the response information carries the wireless charging configuration;
transmitting, by the core network, the wireless charging configuration to the target base station;
receiving, by the terminal, the response information corresponding to the wireless charging request;
determining, by the terminal and according to the response information, the wireless charging configuration;
transmitting, by the target base station, wireless charging signals to the terminal according to the wireless charging configuration; and
receiving, by the terminal, the wireless charging signals transmitted by the target base station.

2. The method according to claim 1, wherein the target condition further comprises at least one of:
the terminal being turned on;
a power of the terminal being lower than a power threshold;
or
the terminal being in a target area.

3. The method according to claim 1, further comprising:
transmitting, by the terminal, a type of the terminal to the core network.

4. The method according to claim 3, wherein determining, by the core network, to perform the wireless charging configuration of charging the terminal wirelessly at least based on the priority further comprises:
determining, by the core network, the priority of charging the terminal wirelessly based on the type of the terminal;
wherein the priority of charging the terminal wirelessly is in inverse proportion to a battery capacity corresponding to the type of the terminal.

5. The method according to claim 1,
wherein in a case that the terminal is non-idle, the one or more non-access stratum signalings comprise at least one of the following signalings:
a second signaling in a registration management procedure,
a third signaling in a mobility management procedure, or
a fourth signaling in a service request procedure.

6. The method according to claim 5,
wherein the second signaling comprises a mobility registration update signaling;
wherein the third signaling comprises a tracking area update signaling; or
wherein the fourth signaling comprises a service request signaling.

7. The method according to claim 1, further comprising:
determining, by the terminal and according to the response information, whether the core network agrees on charging the terminal wirelessly.

8. The method according to claim 1, wherein the wireless charging configuration further indicates a wireless charging resource or a wireless charging power for charging the terminal wirelessly.

9. The method according to claim 1, wherein the wireless charging request carries wireless charging assistance information, wherein the wireless charging assistance information is used to perform at least one of following acts:
assisting the core network in determining whether to agree on charging the terminal wirelessly, or
assisting the core network in determining to perform a wireless charging configuration of charging the terminal wirelessly.

10. The method according to claim 1, further comprising:
determining, by the core network and based on at least one of wireless charging assistance information of the terminal, or states of base stations with wireless charging capability, to perform the wireless charging configuration of charging the terminal wirelessly.

11. The method according to claim 10, wherein the states of the base stations comprise at least one of:
loads of the base stations, or
antenna usages of the base stations.

12. The method according to claim 11, wherein when the states of the base stations comprise the loads of the base stations, determining, by the core network, to perform the wireless charging configuration of charging the terminal wirelessly based on the states of the base stations comprises:
- determining, by the core network, available resources based on the loads of the base stations; and
- determining, by the core network, a resource for charging the terminal wirelessly from the available resources; or wherein when the states of the base stations comprise the antenna usages of the base stations, determining, by the core network, to perform the wireless charging configuration of charging the terminal wirelessly based on the states of the base stations comprises:
- determining, by the core network, antennas that are available for wireless charging based on the antenna usages of the base stations; and
- determining, by the core network, one or more antennas for charging the terminal wirelessly from the antennas that are available for wireless charging.

13. The method according to claim 11, wherein when the wireless charging assistance information comprises wireless charging capability of the terminal, determining, by the core network, whether to charge the terminal wirelessly based on the wireless charging assistance information comprises:
- determining, by the core network, whether there is a match between wireless charging capabilities of the base stations and the wireless charging capability of the terminal; and
- determining, by the core network, to charge the terminal wirelessly in case that there is the match between the wireless charging capabilities of the base stations and the wireless charging capability of the terminal.

14. The method according to claim 10, wherein the wireless charging assistance information of the terminal comprises at least one of:
- charging direction information;
- charging antenna information;
- wireless charging capability;
- space status information; or
- wireless charging state.

15. The method according to claim 14, wherein when the wireless charging assistance information comprises the space status information of the terminal and the states of the base stations comprise space status information of the base stations, determining, by the core network, the wireless charging configuration of charging the terminal wirelessly based on the wireless charging assistance information of the terminal and the states of the base stations comprises:
- determining, by the core network and based on the space status information of the terminal and the space status information of the base stations, a target base station whose efficiency of charging the terminal wirelessly is greater than an efficiency threshold from the base stations.

16. The method according to claim 1, further comprising:
- determining, by the core network and based on at least one of a type of the terminal, wireless charging assistance information of the terminal, or states of base stations with wireless charging capability, whether to agree on charging the terminal wirelessly.

17. The method according to claim 1, wherein the target type comprises at least one of video, voice, or text.

18. The method according to claim 1, wherein the target type comprises an enhanced mobile broadband (eMBB) service, an ultra reliable and low latency communication (URLLC) service, or a massive machine type communication (mMTC).

19. A request transmission system, comprising:
- one or more processors; and
- one or more memories for storing a computer program;
- wherein the computer program, when executed by the one or more processors, implements following act:
  - transmitting, by a terminal, a wireless charging request to a core network through one or more non-access stratum signalings in a non-access stratum when the terminal meets a target condition, wherein the target condition comprises at least the terminal being required to transmit data of a target type, wherein in a case that the terminal is idle, the one or more non-access stratum signalings comprise a first signaling in a registration management procedure, and wherein the first signaling comprises at least one of the following signalings: an attach request signaling, or a registration request signaling;
  - receiving, by the core network, the wireless charging request from the terminal;
  - selecting, by the core network, a target base station from a plurality of base stations for charging the terminal wirelessly based on the wireless charging request;
  - determining, by the core network, to perform a wireless charging configuration of charging the terminal wirelessly at least based on a priority of charging the terminal wirelessly, wherein the wireless charging configuration indicates at least the target base station;
  - transmitting, by the core network, response information to the terminal, wherein the response information carries the wireless charging configuration;
  - transmitting, by the core network, the wireless charging configuration to the target base station;
  - receiving, by the terminal, the response information corresponding to the wireless charging request;
  - determining, by the terminal and according to the response information, the wireless charging configuration;
  - transmitting, by the target base station, wireless charging signals to the terminal according to the wireless charging configuration; and
  - receiving, by the terminal, the wireless charging signals transmitted by the target base station.

* * * * *